United States Patent [19]
Koshimizu et al.

[11] Patent Number: 5,789,679
[45] Date of Patent: Aug. 4, 1998

[54] PRESSURE SENSING DEVICE FOR A FUEL TANK INCLUDING MOUNTING MEMBER

[75] Inventors: Akira Koshimizu; Seiki Kodama; Hiroshi Nakamura, all of Tokyo, Japan

[73] Assignee: Mitsubishi Denki Kabushiki Kaisha, Tokyo, Japan

[21] Appl. No.: 807,730

[22] Filed: Feb. 28, 1997

[30] Foreign Application Priority Data

Aug. 15, 1996 [JP] Japan ................. 8-215750

[51] Int. Cl.$^6$ .............................................. G01H 9/00
[52] U.S. Cl. ............................................... 73/756
[58] Field of Search ................................... 73/756

[56] References Cited

U.S. PATENT DOCUMENTS

| | | | |
|---|---|---|---|
| 5,375,472 | 12/1994 | Mitani et al. | 73/714 X |
| 5,438,877 | 8/1995 | Vowles et al. | 73/756 |
| 5,528,941 | 6/1996 | Ogawa | 73/756 |
| 5,661,244 | 8/1997 | Nishimura et al. | 73/706 |

FOREIGN PATENT DOCUMENTS

| | | |
|---|---|---|
| 4-325316 | 11/1992 | Japan . |
| 8178785 | 7/1996 | Japan . |

*Primary Examiner*—Joseph L. Felber
*Attorney, Agent, or Firm*—Sughrue, Mion, Zinn Macpeak & Seas, PLLC

[57] ABSTRACT

In a pressure sensing device for a fuel tank, a mounting member for mounting a fuel pump is provided with a pressure detecting opening. A base member is fixed to the mounting member through a seal member. A pressure sensor is mounted on the base member. Accordingly, the installation to the fuel tank can be facilitated and the number of parts can be decreased, thereby increasing production efficiency.

5 Claims, 5 Drawing Sheets

PRESSURE SENSING DEVICE FOR A FUEL TANK INCLUDING MOUNTING MEMBER

BACKGROUND OF THE INVENTION

1. Field of the Invention

The present invention relates to a pressure sensing device for a fuel tank which detects internal pressure of a fuel tank employed in an automobile or the like.

2. Description of the Related Art

FIG. 8 is a cross-sectional view showing an example of a conventional pressure sensing device for a fuel tank, wherein the pressure sensing device is enlarged in contrast to the fuel tank. In the figure, a pipe 2 is connected to a fuel tank 1 for an automobile by welding or the like. A cylindrical outer nipple 4 formed at a case 3 is connected to the pipe 2 through a hose 5. A main circuit board 6 is disposed in the case 3. A pressure sensor 7 and an amplifying circuit board 8 are mounted on the main circuit board 6. The pressure sensor 7 has a semiconductor element (not shown) for detecting pressure. An amplifying circuit (not shown) for amplifying an output signal from the pressure sensor 7 is formed on the amplifying circuit board 8.

The pressure sensor 7 is provided with a cylindrical inner nipple 9 which is inserted into the outer nipple 4. An O-ring 10 is disposed between the outer nipple 4 and the inner nipple 9. Hose bands 11 are fitted to both end portions of the hose 5, and thus the hose 5 is bound from the outside.

The operation will now be described. Internal pressure of the fuel tank 1 is introduced to the inner nipple 9 via the pipe 2, hose 5 and the outer nipple 4, and detected by the pressure sensor 7. The output signal from the pressure sensor 7 is amplified by the amplifying circuit of the amplifying circuit board 8 and output to the outside. By detecting the internal pressure of the fuel tank 1 in such a manner, leakage of fuel such as gasoline from the fuel tank 1 can be monitored.

Further, when the pressure sensing device is provided at the fuel tank 1, it is necessary to maintain secure sealing of the joining portions, to prevent changes in internal pressure caused by air leakage, as well as the occurrence of fires caused by the leakage of vaporized gasoline, or the like. For this reason, in the conventional pressure sensing device, the pipe 2 is welded to the fuel tank 1 and the joining portions of the hose 5 to the pipe 2 and the outer nipple 4 are bound by the hose bands 11 as shown in FIG. 8.

Moreover, airtightness between the outer nipple 4 and the inner nipple 9 is maintained by the O-ring 10. Accordingly, reductions in detection precision caused by the leakage of vaporized gasoline is prevented and the amplifying circuit board 8 disposed in the case 3 can be protected by isolating it from the vaporized gasoline atmosphere.

In the conventional pressure sensing device constructed as described above, although airtightness of the path for introducing the pressure of the measured medium to the pressure sensing device is maintained, the operations such as the welding of the pipe 2 to the fuel tank 1 and the joining of the hose 5 between the pipe 2 and the outer nipple 4 require much time and labor, so production efficiency is impaired. Also, it is necessary to secure enough operating space to install the pressure sensing device. Further, since the hose 5 and the hose bands 11 are needed to join the fuel tank 1 and the outer nipple 4, the number of parts and the number of processes for assembly are increased.

SUMMARY OF THE INVENTION

The present invention has been achieved with a view toward solving the problems described above, and it is an object of the present invention to provide a pressure sensing device which allows facilitated installation to a fuel tank and which requires less parts, thereby increasing the production efficiency.

To this end, according to one aspect of the present invention, there is provided a pressure sensing device for a fuel tank, comprising: a mounting member for mounting a fuel pump to the fuel tank, the mounting member being provided with a pressure detecting opening; a base member fixed on the mounting member, the base member having a pressure introducing portion which is connected with the pressure detecting opening; a seal member disposed between the mounting member and the base member so as to surround the pressure detecting opening; a pressure sensor for detecting an internal pressure of the fuel tank through the pressure detecting opening, the pressure sensor being mounted to the base member; and a cover provided at the base member so as to cover the pressure sensor.

According to another aspect of the present invention, there is provided a pressure sensing device for a fuel tank, comprising: a mounting member for mounting a fuel pump to the fuel tank, the mounting member being provided with a pressure detecting opening and a sensor mounting portion, the sensor mounting portion being molded integrally with the mounting member; a pressure sensor for detecting an internal pressure of the fuel tank through the pressure detecting opening, the pressure sensor being mounted on the sensor mounting portion; and a cover provided at the sensor mounting portion so as to cover the pressure sensor.

According to a still further aspect of the present invention, there is provided a pressure sensing device for a fuel tank, comprising: a mounting member for mounting a fuel pump to the fuel tank, the mounting member being provided with a recess; a pressure introducing nipple joined airtightly to the bottom portion of the recess of the mounting member; a pressure sensor for detecting an internal pressure of the fuel tank through the pressure introducing nipple, the pressure sensor being disposed in the recess; and a cover provided at the mounting member so as to cover the recess.

DETAILED DESCRIPTION OF THE PREFERRED EMBODIMENTS

The embodiments according to the present invention will now be described with reference to the accompanying drawings.

First Embodiment

Figure 1:
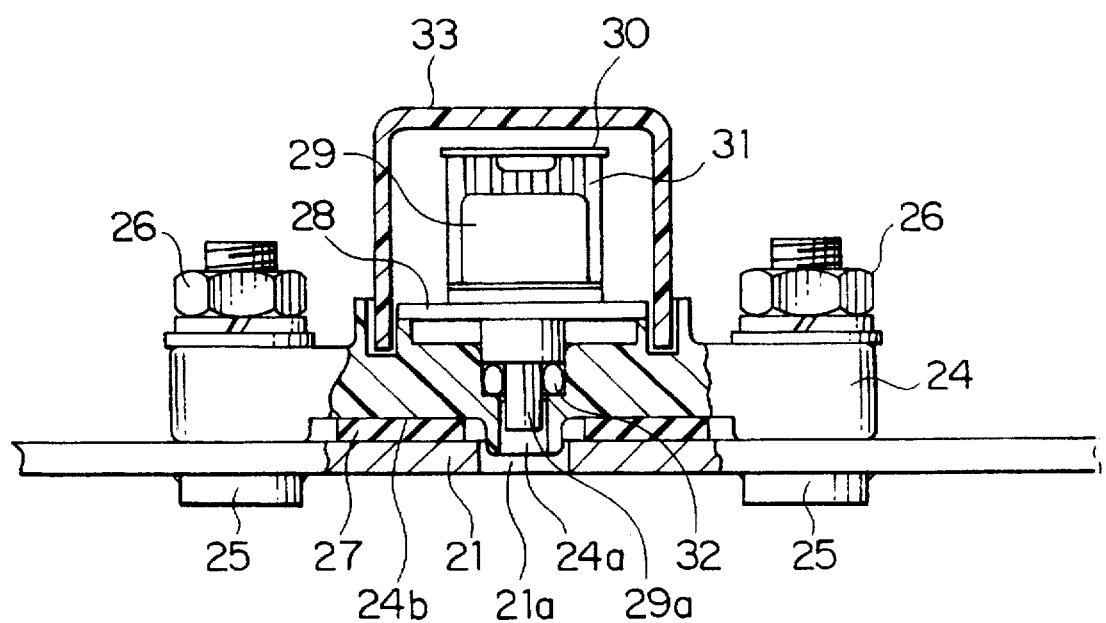
FIG. 1 is a front view showing a partial cross-section of a pressure sensing device for a fuel tank as a first embodiment of this invention.
Figure 2:
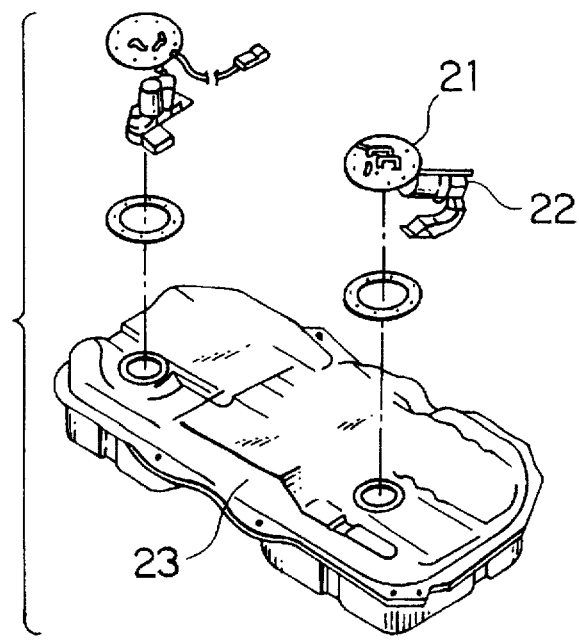
FIG. 2 is an exploded perspective view showing a method for mounting a mounting member in FIG. 1 to the fuel tank.
Figure 3:
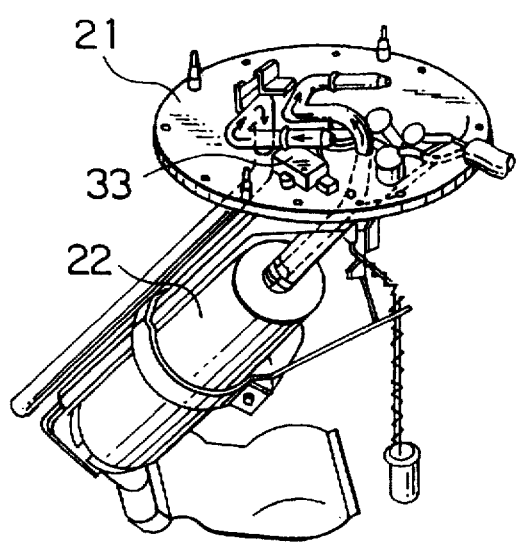
FIG. 3 is an enlarged perspective view showing the mounting member in FIG. 2.

FIG. 1 is a front view showing a partial cross-section of a pressure sensing device for a fuel tank as the First Embodiment of this invention. FIG. 2 is an exploded perspective view showing a method for mounting the mounting member in FIG. 1 to the fuel tank. FIG. 3 is an enlarged perspective view showing the mounting member in FIG. 2.

A fuel pump 22 supported by a mounting member 21 is mounted to a fuel tank 23 through the mounting member 21 with a pressure sensing device of this invention also being mounted to the same mounting member 21. The mounting member 21 is composed of thick metal plate having sufficient rigidity. However, it is also possible for the mounting member 21 to be composed of thin plastic plate reinforced by rib members. The mounting member 21 is further provided with a pressure detecting opening 21a.

A base member 24 made of plastic is fixed on the mounting member 21 through a plurality of bolts 25 welded to the mounting member 21 and a plurality of nuts 26 screwed onto the bolts 25. The base member 24 is provided with a pressure introducing portion (introducing aperture) 24a which is connected with the opening 21a. An annular seal member 27 made of rubber or the like is disposed between the base member 24 and the mounting member 21 so as to surround the opening 21a. A flat surface portion 24b is formed at the contact surface of the base member 24 with the seal member 27 to improve adhesion efficiency.

A main circuit board 28 is adhered to the base member 24. A pressure sensor 29 having a semiconductor element (not shown) for detecting a pressure is mounted on the main circuit board 28. Also, an amplifying circuit board 30 is mounted on the main circuit board 28 through a plurality of leads 31. An amplifying circuit (not shown) for amplifying an output signal from the pressure sensor 29 is formed on the amplifying circuit board 30. The pressure sensor 29 is provided with a cylindrical nipple 29a which is inserted into the pressure introducing portion 24a. An O-ring 32 is disposed between the nipple 29a and the pressure introducing portion 24a. Further, a cover (connector housing) 33 made of plastic, which covers the pressure sensor 29, is adhered to the base member 24 through adhesives to make it waterproof. The cover 33 is provided with a connector (not shown) for external connections that is electrically connected with the circuit on the main circuit board 28.

In this embodiment, since the pressure sensing device may be easily mounted to the mounting member 21 merely by putting the base member 24 on the mounting member 21 through the seal member 27 and fastening the nuts 26, and since the pressure sensing device is installed to the fuel tank 23 by simply attaching the mounting member 21 to the fuel tank 23, the installation of the pressure sensing device to the fuel tank 23 is greatly facilitated. Also, since there is no necessity for welding a special purpose pipe to the fuel tank 23 and introducing a pressure via a hose, the number of parts and the number of assembly processes are decreased. Further, airtightness is maintained with just a simple construction, i.e., the seal member 27 and the O-ring 32 alone.

Moreover, since the base member is fixed by tightening the through bolts 25 fixed to the mounting member 21 with the nuts 26 screwed into the bolts 25 so as to maintain airtightness, the mounting of the base member 24 to the mounting member 21 is facilitated and airtightness can be improved.

Second Embodiment

Figure 4:
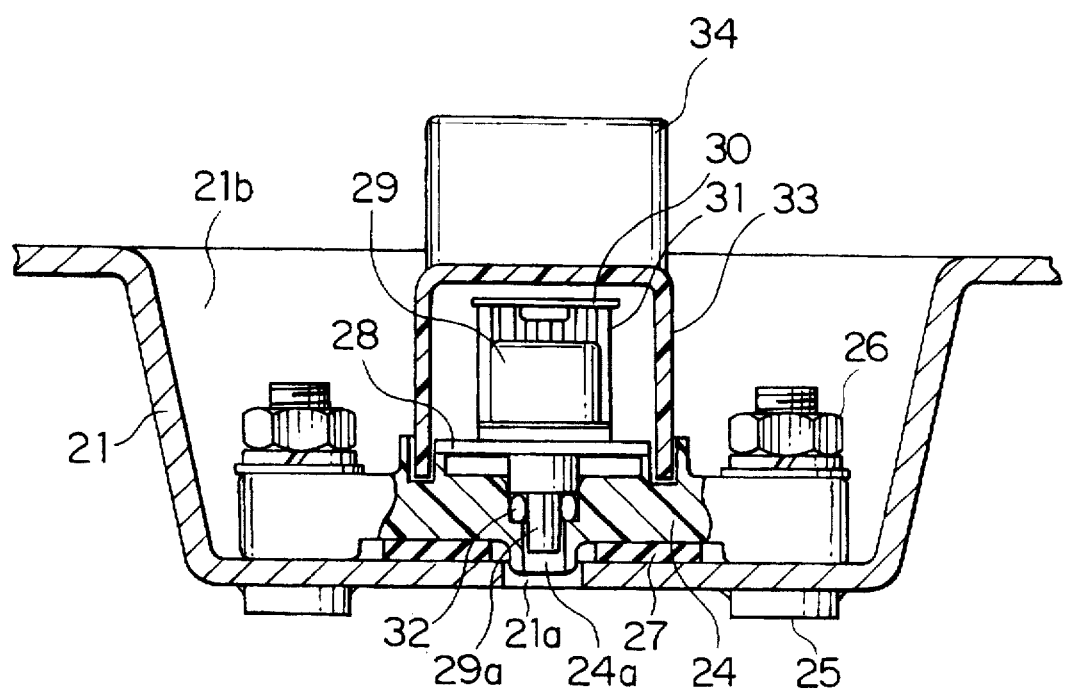
FIG. 4 is a cross-sectional view showing a pressure sensing device for a fuel tank as a second embodiment of this invention.

Next, FIG. 4 is a cross-sectional view showing a pressure sensing device for a fuel tank as the Second Embodiment of this invention. In this embodiment, the mounting member 21 is provided with a recess 21b, and the pressure sensing device is fixed in the recess 21b. Further, only connector 34 for external connection, which is provided in the cover 33, is projected outside of the recess 21b. In other words, the pressure sensing device except for the connector 34, is located in the recess 21b. The other constructions are the same as in the First Embodiment described above.

In such a pressure sensing device, since the projecting height after being installed to the fuel tank 23 can be reduced, the mounting position of the fuel pump 22 to the fuel tank 23 can be established without regard to the height of the pressure sensing device itself. Further, since the connector 34 is projected to the outside of the recess 21b, the ease of the wiring operation is not reduced. However, it is also possible that the whole pressure sensing device including the connector 34 be disposed in the recess 21b.

Third Embodiment

Figure 5:
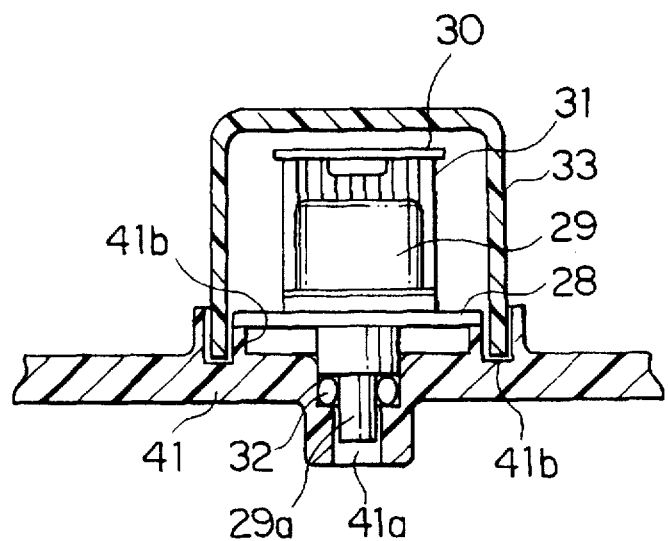
FIG. 5 is a cross-sectional view showing a pressure sensing device for a fuel tank as a third embodiment of this invention.

Next, FIG. 5 is a cross-sectional view showing a pressure sensing device for a fuel tank as the Third Embodiment of this invention. In the figure, a mounting member 41 made of molding material such as plastic is provided with a pressure detecting opening 41a. A sensor mounting portion 41b is molded integrally with the mounting member 41. The main circuit board 28 which supports the pressure sensor 29 and the amplifying circuit board 30 is adhered to the sensor mounting portion 41b. The nipple 29a of the pressure sensor 29 is inserted to the opening 41a. Also, the cover 33 is adhered to the sensor mounting portion 41b. Further, the mounting member 41 supports the fuel pump 22 and is attached to the fuel tank 23 as shown in FIGS. 2 and 3.

Since the sensor mounting portion 41b is molded integrally with the mounting member 41, the base member 24 and the seal member 27 shown in FIG. 1 is omitted, and thus the number of parts is reduced and the assembly is facilitated. Further, the only place that needs to maintain airtightness is the place between the mounting member 41 and the nipple 29, where the O-ring 32 is disposed, thereby improving reliability.

Fourth Embodiment

Figure 6:
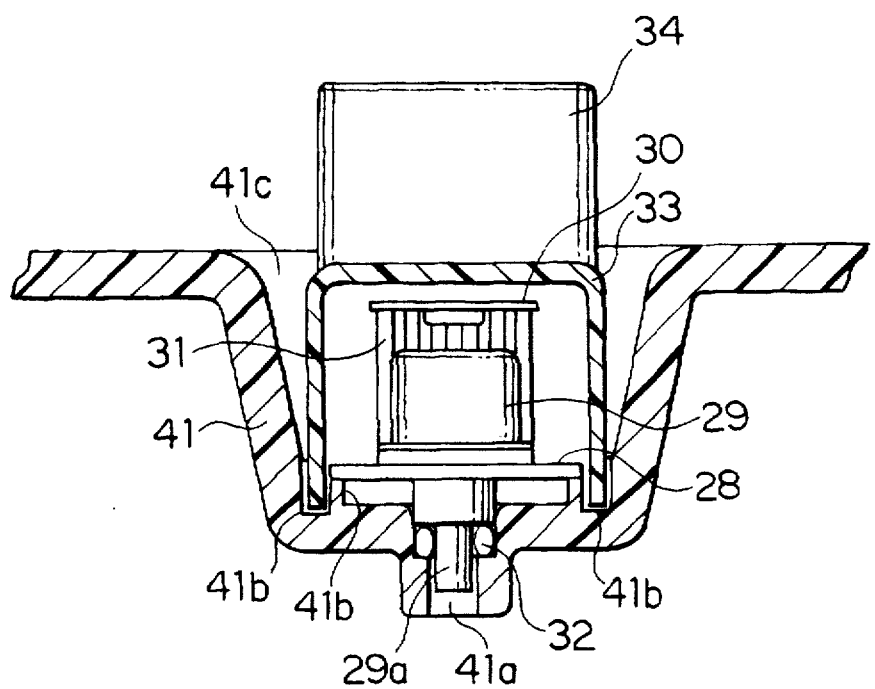
FIG. 6 is a cross-sectional view showing a pressure sensing device for a fuel tank as a fourth embodiment of this invention.

FIG. 6 is a cross-sectional view showing a pressure sensing device for a fuel tank as the Fourth Embodiment of this invention. In this embodiment, the mounting member 41 made of molding material such as plastic is provided with a recess 41c. The opening 41a and the sensor mounting portion 41b are provided in the recess 41c. Further, only the connector 34 for external connections, which is provided at the cover 33, is projected to the outside of the recess 41c. The other constructions are the same as the Third Embodiment described above.

In such a pressure sensing device, since the projecting height after being installed to the fuel tank 23 can be reduced, the mounting position of the fuel pump 22 to the fuel tank 23 can be established without regard to the height of the pressure sensing device itself. Further, since the connector 34 is projected to the outside of the recess 21b, the ease of the wiring operation is not reduced.

Fifth Embodiment

Figure 7:
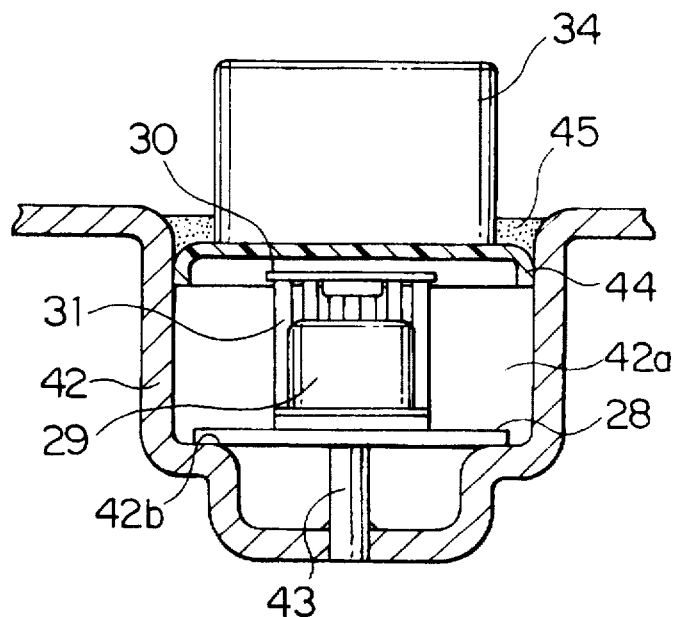
FIG. 7 is a cross-sectional view showing a pressure sensing device for a fuel tank as a fifth embodiment of this invention.
Figure 8:
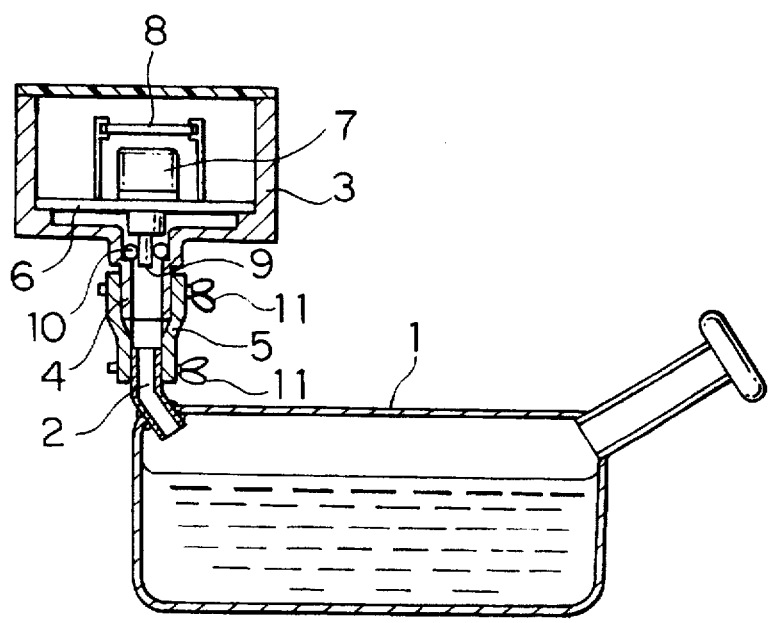
FIG. 8 is a cross-sectional view showing an example of a conventional pressure sensing device for a fuel tank.

FIG. 7 is a cross-sectional view showing a pressure sensing device for a fuel tank as the Fifth Embodiment of this invention. In the figure, a mounting member 42 made of metal is provided with a recess 42a. A cylindrical pressure introducing nipple 43 is joined airtightly, for example, by welding, to the bottom portion of the recess 42a. The main circuit board 28 which supports the pressure sensor 29 and the amplifying circuit board 30 is fixed to a step portion 42b provided in the recess 42a. The pressure introducing nipple 43 is connected with the pressure sensor 29.

A cover 44 is pressed into the opening of the recess 42a. An adhesive 45 for making the recess waterproof is adhered between the fringe portion of the cover 44 and the mounting member 42. Further, only the connector 34 for external connections, which is provided at the cover 44, is projected to the outside of the recess 42a. Furthermore, the mounting member 42 supports the fuel pump 22 and is attached to the fuel tank 23 as shown in FIGS. 2 and 3.

In such a pressure sensing device, since the pressure introducing nipple 43 is joined airtightly to the mounting member 42, there is no need to provide an O-ring at the outer periphery of the pressure introducing nipple 43, and thus reliable airtightness can be maintained.

What is claimed is:

1. A pressure sensing device for a fuel tank, comprising:
   a mounting member for mounting a fuel pump to said fuel tank, said mounting member being provided with a pressure detecting opening and a sensor mounting portion, said sensor mounting portion being molded integrally with said mounting member;
   a pressure sensor for detecting an internal pressure of said fuel tank through said pressure detecting opening, said pressure sensor being mounted on said sensor mounting portion; and
   a cover provided at said sensor mounting portion so as to cover said pressure sensor.

2. A pressure sensing device for a fuel tank according to claim 1, wherein said mounting member is provided with a recess, and said pressure detecting opening and said sensor mounting portion are provided inside of said recess.

3. A pressure sensing device for a fuel tank according to claim 2, wherein said cover is provided with a connector for external connections, and said connector is projected to the outside of said recess.

4. A pressure sensing device for a fuel tank, comprising:
   a mounting member for mounting a fuel pump to said fuel tank, said mounting member being provided with a recess;
   a pressure introducing nipple joined airtightly to the bottom portion of said recess of said mounting member;
   a pressure sensor for detecting an internal pressure of said fuel tank through said pressure introducing nipple, said pressure sensor being disposed in said recess; and
   a cover provided at said mounting member so as to cover said recess.

5. A pressure sensing device for a fuel tank according to claim 4, wherein said cover is provided with a connector for external connections, and said connector is projected to the outside of said recess.

* * * * *